United States Patent [19]
Christie et al.

[11] 3,896,221
[45] July 22, 1975

[54] ANESTHETIC COMPOSITION

[75] Inventors: George Johnstone Christie, Skaneateles; Frank Harold Buckwalter, Syracuse, both of N.Y.

[73] Assignee: Bristol-Myers Company, New York, N.Y.

[22] Filed: Feb. 28, 1973

[21] Appl. No.: 336,848

[52] U.S. Cl. ............... 424/246; 424/324; 424/330
[51] Int. Cl. ............................................ A61k 27/00
[58] Field of Search ..................... 424/346, 324, 330

[56] References Cited
OTHER PUBLICATIONS

Physicians Desk Reference, 25 ed. 1971, pages 594–596.
New Drugs, 1966, pages 139, 140, 203 and 429.

*Primary Examiner*—Jerome D. Goldberg
*Attorney, Agent, or Firm*—Robert E. Havranek

[57] ABSTRACT

There is disclosed a novel anesthetic compound, which upon intramuscular injection in cats, produces the advantageous anesthetic effects of ketamine but which does not result in many of the frequently encountered adverse effects observed in cats as a result of ketamine anesthesia, said anesthetic composition comprising ketamine; a member selected from the group consisting of promazine, chlorpromazine, prochlorperazine, perphenazine, trifluoperazine, and methoxypromazine; and aminopentamide, or pharmaceutically acceptable, non-toxic salts thereof. There is also disclosed a method for anesthetizing cats by the intramuscular injection of such a composition. A particularly preferred composition comprises a sterile aqueous solution of 100.0 mg. of ketamine hydrochloride, 7.5 mg. of promazine hydrochloride, 0.0625 mg. of aminopentamide hydrogen sulfate, and 0.1 mg. of benzethonium chloride in an amount of water sufficient to make up 1 ml.

9 Claims, No Drawings

ANESTHETIC COMPOSITION

BACKGROUND OF THE INVENTION

1. Field of the Invention

This invention is in the field of combinations of drugs for producing anesthesia and, more particularly, this invention relates to a rapid-acting, non-narcotic, non-barbiturate anesthetic composition for use in mammals, e.g., cats.

2. Description of the Prior Art

A. The Physicians' Desk Reference, 26th Edition, (1972), pages 595–597, describes ketamine hydrochloride, which is chemically designated dl 2-(o-chlorophenyl)-2-methylamino cyclohexanone as a rapid-acting, non-narcotic, non-barbiturate anesthetic containing benzethonium chloride as a preservative. It further states that in certain circumstances, the action of ketamine hydrochloride may be supplemented with a muscle relaxant, that a drying agent such as atropine should be given at appropriate intervals prior to induction and that pressor response to ketamine hydrochloride is reduced or blocked by chlorpromazine.

B. Beck et al., "Evaluation of Vetalar (ketamine hydrochloride) A Unique Feline Anesthetic", *Veterinary Medicine/Small Animal Clinician*, pages 993–996, (October, 1971), describes studies involving the use of intramuscular injections of ketamine hydrochloride as an anesthetic for cats. In some instances, atropine was administered as a premedicant to control salivation and muscle relaxants or other anesthetic agents were sometimes used in conjunction with the ketamine hydrochloride. A number of disadvantages in the use of ketamine hydrochloride as an anesthetic are noted.

C. C. Faenzi, *Boll. Soc. Ital. Biol. Sper.*, 37(9), 414–417 (1961), (*Chemical Abstracts*, 60, 16377h(1964)) describes the action of promazine on mice which were under the anesthetic influence of procaine, butacaine and tetracaine. Promazine gave significant protection of the animals toward the convulsive state induced by the local anesthetics.

D. I. S. Chandna, *Indian Vet. J.*, 47(11), 996 (1970), (*Chemical Abstracts*, 74 97910k(1971) describes the action of selected general anesthetics in combination with chlorpromazine or promazine on buffalo calves. The combinations were found safe in use with this species.

E. The Merck Index, Eighth Edition, describes the preparation of aminopentamide and its use as an anticholinergic agent (page 59). This reference also describes promazine, which is chemically designated 10-(3-dimethylaminopropyl)phenothiazine (page 869); chlorpromazine, which is chemically designated 2-chloro-10-(3-dimethylaminopropyl)phenothiazine (page 250); prochlorperazine, which is chemically designated 3-chloro-10-[3-(4-methyl-1-piperazinyl)-propyl]phenothiazine (page 867); perphenazine, which is chemically designated 4-[3-(2-chlorophenothiazin-10-yl)propyl]-1-piperazineethanol (page 800); trifluoperazine, which is chemically designated 10-[3-(4-methylpiperazin-1-yl)propyl]-2-trifluoromethylphenothiazine (page 1073); and methoxypromazine, which is chemically designated 10-(3-dimethylaminopropyl)-2-methoxyphenothiazine (page 678).

So far as applicants are aware, the combination of ketamine; a member selected from the group consisting of promazine, chlorpromazine, prochlorperazine, perphenazine, trifluoperazine and methoxypromazine; and aminopentamide or salts thereof, or the use of such a combination to produce anesthesia by intramuscular injection thereby achieving a wide margin of safety, excellent muscle relaxation followed by a smooth recovery has not been described in the art.

Ketamine hydrochloride is a rapid-acting anesthetic which produces profound anelgesia, normal pharyngeal-laryngeal reflexes, mild cardiac stimulation and respiratory depression. The anesthetic state produced does not fit into the conventional classification of stages of anesthesia. Instead, ketamine hydrochloride produces a state of unconsciousness which has been termed "dissociative" anesthesia in that it appears to selectively interrupt association pathways to the brain before producing somesthetic sensory blockade. In contrast to other anesthetics, protective reflexes, such as coughing and swallowing, are maintained under ketamine hydrochloride anesthesia.

It has been reported by DeYoung et al., *Journal Amer. Vet. Med. Association*, Vol. 161, pages 1442–1445 (Dec. 1, 1972) that dissociative anesthetic agents have many advantages over other types of anesthetic agents in dogs and cats including ease of administration requiring minimal patient restraint, rapid onset of action, persistence of pharyngeal and laryngeal reflexes, mild hypothermia and wide margin of safety. According to these authors, dissociative anesthetic agents such as ketamine hydrochloride have the potential to revolutionize the anesthetic management of the dog and cat.

However, certain disadvantages have been encountered when ketamine hydrochloride has been used as an anesthetic agent in cats. Thus, tonic-clonic convulsions occasionally occur in cats when ketamine hydrochloride has been used as the anesthetic agent. While such convulsions rarely can be categorized as grand mal seisures, they are of considerable concern to the clinician. Moreover, hypersalivation occasionally occurs which constitutes an added anesthetic hazard in those subjects affected. Further, there is a lack of muscle relaxation generally associated with the use of ketamine hydrochloride in cats and there are occasional instances of prolonged recovery and postrecovery anorexia.

In order to counteract muscle hypertension and reduce recovery time, Amend et al., *Veterinary Medicine/Small Animal Clinician*, pages 1305 and 1307 (Dec., 1972) injected cats with the tranquilizer-analgesic xylazine twenty minutes prior to the intramuscular injection of ketamine hydrochloride, Reid et al., "Prevention of Undesirable Side Reactions of Ketamine Anesthesia in Cats", *J. Amer. Anim. Hosp. Assoc.*, Vol. 8, pages 115–119 (March, 1972), describes the premedication of cats with a combination of a narcotic (oxymorphone) and an ataractic (triflupromazine) followed by a less than recommended dose of ketamine to block the undesired side reactions when ketamine is used alone in higher doses. Reid et al. also report that when these three agents were administered together, a prolonged apnea was encountered in some patients.

Thus, it is apparent that work done by others in attempting to minimize the adverse side effects of ketamine hydrochloride has focused on premedication. No single anesthetic composition containing ketamine which minimizes the adverse side effects of ketamine upon intramuscular injection has been reported.

SUMMARY OF THE INVENTION

It is an object of this invention to develop a non-narcotic, non-barbiturate anesthetic composition which possesses the advantageous therapeutic properties of ketamine hydrochloride and which minimizes the adverse side effects of ketamine hydrochloride in cats. This object is achieved by the formulation of a composition comprising ketamine; a member selected from the group consisting of promazine, chlorpromazine, prochlorperazine, perphenazine, trifluoperazine and methoxypromazine; and aminopentamide or pharmaceutically acceptable, nontoxic salts thereof.

A preferred composition of this invention comprises a sterile aqueous solution of ketamine hydrochloride, promazine hydrochloride, aminopentamide hydrogen sulfate and a stabilizing amount of benzethonium chloride. Preferably, the composition contains about 0.25 to 0.025 parts by weight of promazine hydrochloride and from about 0.1 to 0.001 parts by weight of aminopentamide hydrogen sulfate for every part by weight of ketamine hydrochloride. A particularly suitable dosage form comprises 100.0 mg. of ketamine hydrochloride, 7.5 mg. of promazine hydrochloride, 0.0625 mg. of aminopentamide hydrogen sulfate and 0.1 mg. of benzethonium chloride in an amount of water sufficient to make up 1 ml. These materials are all chemically and physically compatible and the composition retains its efficacy after prolonged periods of storage.

The compositions of this invention are useful for inducing anesthesia in mammals such as dogs and cats. They are particularly valuable for use by intramuscular injection in cats. The preferred dosage in an amount of solution sufficient to provide between about 5 to 25 mg. of ketamine hydrochloride per pound of body weight. The particular dosage employed is dependent upon the surgical procedure for which the anesthetic composition is to be used. Thus, for minor surgery (e.g., lancing abscesses, etc.), suturing, oral prophylaxis, X-ray, etc. or as an induction agent to be followed by another anesthetic or muscle relaxant, a dosage which will provide about 5 to 10 mg. of ketamine hydrochloride per pound of body weight is generally sufficient; for procedures such as declawing, castration, catheterization, Caesarean section and dentistry, a dosage which will provide about 10 to 15 mg. per pound of body weight is sufficient; and for procedures such as general surgery, abdominal surgery, orthopedic surgery and hysterectomy, a dosage which will provide about 15 to 20 mg. per pound of body weight is preferred.

Supplemental doses of one-half the initial dose may be given to prolong the duration of anesthesia where necessary. These doses may be given at 20 minute intervals for extended procedures.

If the required level of anesthesia has not been reached within 10 minutes following the initial dose of the composition of this invention, it may be necessary to supplement its action by the administration of, for example, a barbiturate or an inhalation anesthetic agent. The ingredients of this invention are physiologically compatible with the common general and local anesthetic agent when adequate respiratory exchange is maintained. However, barbiturates and ketamine hydrochloride are incompatible because of precipitate formation and should therefore not be injected from the same syringe.

To reduce the possibility of vomiting, it is preferred that the animal be given nothing to eat or drink for six hours prior to induction when preparing for elective surgery.

By the practice of this invention, the dissociative anesthetic effects of ketamine are achieved but many of the adverse side effects are avoided. The composition provides a wide margin of safety, excellent muscle relaxation, a low degree of salivation, and is followed by a smooth recovery.

DESCRIPTION OF THE PREFERRED EMBODIMENTS

Example 1

A sterile, injectable solution is prepared, each ml. containing 100.0 mg. of ketamine hydrochloride, 7.5 mg. of promazine hydrochloride, 0.065 mg. of aminopentamide hydrogen sulfate, 0.1 mg. of benzethonium chloride and water in a quantify sufficient to make 1.0 ml.

The composition of Example 1 was tested by fourteen different clinical investigators for use as an anesthetic agent in cats. The composition was administered to the cats by intramuscular injection in dosages dependent upon the particular treatment to be performed on the subject. The results of these tests are set forth in Tables I to VI. In the tables, the dosage is calculated as the amount of ketamine hydrochloride based upon the body weight of the subject (mg./lb.). In each test, the investigator's evaluation of the anesthesia produced was recorded by him as Excellent, Good, Fair, or Poor, for the purpose intended.

Tables I, II, and III summarize the results obtained by varying the dosage for three different types of operations, i.e., hysterectomy, castration and onychetomy.

Tables IV and V summarize the evaluation of the anesthetic effect of the composition at low doses, (i.e., up to 10 mg./lb.) and higher doses (i.e., over 10 mg./lb.).

Table VI represents an overall summary of all of the tests.

With the exception of hysterectomy and declawing, for which higher doses are preferred, little difference is discernible at different dosage levels. Lower dosages are adequate for minor procedures. Relatively few adverse side reactions were recorded.

TABLE I

| Dose in mg./lb. | Hysterectomy Excellent | Good | Fair | Poor | Total |
|---|---|---|---|---|---|
| 5.0 – 7.5 | 1 | 0 | 0 | 0 | 1 |
| 7.6 – 10.0 | 18 | 0 | 1 | 1 | 20 |
| 10.0 – 12.5 | 26 | 12 | 1 | 0 | 39 |
| 12.6 – 15.0 | 23 | 9 | 1 | 0 | 33 |
| 15.1 – 17.5 | 15 | 3 | 2 | 0 | 20 |
| 17.6 – 20.0 | 8 | 0 | 0 | 0 | 8 |
| 20.1 – 23.1 | 2 | 1 | 0 | 0 | 3 |
| Total | 93 | 25 | 5 | 1 | 124 |

TABLE II

| Dose in mg./lb. | Castration Excellent | Good | Fair | Poor | Total |
|---|---|---|---|---|---|
| 5.0 – 7.5 | 3 | 3 | 3 | 1 | 10 |
| 7.6 – 10.0 | 32 | 10 | 2 | 0 | 44 |
| 10.1 – 12.5 | 20 | 4 | 1 | 0 | 25 |
| 12.6 – 15.0 | 12 | 0 | 0 | 0 | 12 |
| 15.1 – 18.2 | 5 | 0 | 0 | 0 | 5 |
| Total | 72 | 17 | 6 | 1 | 96 |

TABLE III

| Dose in mg./lb. | Onychectomy Excellent | Good | Fair | Poor | Total |
|---|---|---|---|---|---|
| 5.0 – 7.5 | 1 | 1 | 0 | 0 | 2 |
| 7.6 – 10.0 | 17 | 1 | 1 | 1 | 20 |
| 10.1 – 12.5 | 25 | 2 | 0 | 0 | 27 |
| 12.6 – 15.0 | 10 | 2 | 0 | 0 | 12 |
| 15.1 – 17.5 | 8 | 2 | 0 | 0 | 10 |
| 17.6 – 20.0 | 3 | 0 | 0 | 0 | 3 |
| 20.1 – 23.5 | 1 | 0 | 0 | 0 | 1 |
| Total | 65 | 8 | 1 | 1 | 75 |

TABLE IV

Efficacy by Indication
Dosage - up to and including 10 mg./lb.

| Indication | Excellent | Good | Fair | Poor | Total |
|---|---|---|---|---|---|
| Castration | 35 | 14 | 4 | 1 | 54 |
| Urinary Obstruction | 20 | 4 | 0 | 0 | 26 |
| Declaw | 18 | 2 | 1 | 1 | 22 |
| Hysterectomy | 19 | 0 | 1 | 1 | 21 |
| Abscess Treatment | 14 | 3 | 1 | 0 | 18 |
| Dentistry | 12 | 2 | 1 | 0 | 15 |
| X-ray | 15 | 0 | 0 | 0 | 15 |
| Urethrostomy | 12 | 0 | 1 | 1 | 14 |
| Fracture Reduction | 10 | 3 | 0 | 0 | 13 |
| Grooming | 3 | 1 | 1 | 0 | 5 |
| Ear Cleaning | 3 | 0 | 0 | 0 | 3 |
| Miscellaneous | 34 | 6 | 0 | 0 | 40 |
| Total | 195 | 35 | 10 | 4 | 246 |

TABLE V

Efficacy by Indication
Dosage - over 10 mg./lb.

| Indication | Excellent | Good | Fair | Poor | Total |
|---|---|---|---|---|---|
| Hysterectomy | 122 | 28 | 4 | 1 | 155 |
| Declaw | 45 | 7 | 0 | 0 | 52 |
| Castration | 37 | 4 | 1 | 0 | 42 |
| Abscess Treatment | 24 | 2 | 2 | 0 | 28 |
| X-ray | 13 | 2 | 1 | 1 | 17 |
| Ear Cleaning | 5 | 1 | 0 | 0 | 6 |
| Urinary Obstruction | 4 | 1 | 0 | 0 | 5 |
| Urethrostomy | 3 | 0 | 0 | 0 | 3 |
| Fracture Reduction | 8 | 0 | 0 | 0 | 8 |
| Dentistry | 3 | 0 | 0 | 0 | 3 |
| Grooming | 5 | 0 | 0 | 0 | 5 |
| Miscellaneous | 15 | 3 | 2 | 0 | 20 |
| Total | 284 | 48 | 10 | 2 | 344 |

TABLE VI

| Dosage Range | Evaluation of Efficacy - All Cases Excellent | Good | Fair | Poor | Total |
|---|---|---|---|---|---|
| 4 – 10 mg./lb. | | | | | |
| No. of Cases | 189 | 35 | 10 | 4 | 238 |
| % of Total | 79.0 | 14.7 | 4.2 | 1.7 | 99.6 |
| Over 10 mg./lb. | | | | | |
| No. of Cases | 216 | 43 | 11 | 2 | 272 |
| % of Total | 79.4 | 15.8 | 4.0 | 0.7 | 99.9 |
| Total | 405 | 78 | 21 | 6 | 510 |

Table VII

EFFICACY IN EXOTIC BREEDS OF CATS

| Breed | Excellent(%) | Good(%) | Fair(%) | Poor(%) | Total |
|---|---|---|---|---|---|
| Dose: 10 mg./lb. or less | | | | | |
| Siamese | 26 (79%) | 4 (12%) | 1 (3%) | 2 (6%) | 33 |
| Other Exotic | 7 (58%) | 2 (16%) | 2 (16%) | 1 (8%) | 12 |
| Dose: Over 10 mg./lb. | | | | | |
| Siamese | 42 (84%) | 7 (14%) | 1 (2%) | 0 | 50 |
| Other Exotic | 11 (85%) | 1 (7%) | 1 (7%) | 0 | 13 |

It will be noted that there is no difference in the evaluation which can be related to the dose used. In each case, approximately 95 per cent of cases were considered highly satisfactory (i.e., Excellent or Good).

With the exception of hysterectomy and declawing, for which higher doses were clearly preferred, little difference is discernible, either in the efficacy at different dosage levels, or a clear preference for high or low dose for the other indications. However, it is apparent that the lower doses are adequate for minor procedures.

Since it is frequently stated that exotic breeds of cats, (i.e., Siamese) react differently to drugs than do domestic breeds, the composition of Example 1 was administered by intramuscular injection to Siamese and other exotic cats. The results are set forth in Table VII. It will be noted that the results compare favorably with those reported in Tables I – VI.

Examples 2 – 4

Sterile, injectable solutions are prepared having compositions as set forth in Table VII. Stability tests run on these compositions indicate satisfactory stability after storage for 6 months.

Table VIII

| | Example 2 | Example 3 | Example 4 |
|---|---|---|---|
| Ketamine hydrochloride | 100.0 mg. | 100.0 mg. | 100.0 mg. |
| Promazine hydrochloride | 12.5 mg. | 12.5 mg. | 7.5 mg. |
| Aminopentamide hydrogen sulfate | 0.25 mg. | 0.125 mg. | 0.25 mg. |
| Benzethonium chloride | 0.1 mg. | 0.1 mg. | 0.1 mg. |
| Sterile water, q.s. to | 1.0 ml. | 1.0 ml. | 1.0 ml. |
| pH of final solution | 2.8 | 2.8 | 2.8 |

We claim:

1. A method for inducing anesthesia in an animal which comprises injecting said animal with an effective amount of an anesthetic composition comprising 100.0 mg. of ketamine hydrochloride, 7.5 mg. of promazine hydrochloride and 0.0625 mg. of aminopentamide hydrogen sulphate in an amount of water sufficient to make up 1 ml.

2. A method as defined in claim 1 wherein said animal is a cat or a dog and wherein said anesthetic composition is injected intramuscularly.

3. A method as defined in claim 2 wherein said anesthetic composition contains a stabilizing amount of benzethonium chloride.

4. A method as defined in claim 3 wherein said animal is a cat.

5. A method as defined in claim 2, wherein an amount of said anesthetic composition is injected to provide between about 5 to 25 mg. of ketamine hydrochloride per pound of body weight.

6. A method as defined in claim 5, wherein said anesthetic composition provides from about 5 to 10 mg. of ketamine hydrochloride per pound of body weight.

7. A method as defined in claim 5, wherein said anesthetic composition provides from about 10 to 15 mg. of ketamine hydrochloride per pound of body weight.

8. A method as defined in claim 5, wherein said anesthetic composition provides from about 15 to 20 mg. of ketamine hydrochloride per pound of body weight.

9. An anesthetic composition comprising 100.0 mg. of ketamine hydrochloride, 7.5 mg. of promazine hydrochloride and 0.0625 mg. of aminopentamide hydrogen sulphate in an amount of water sufficient to make up 1 ml.

* * * * *